J. LAZARUS.
MEASURING DEVICE.
APPLICATION FILED AUG. 13, 1909.
955,519.
Patented Apr. 19, 1910.
2 SHEETS—SHEET 1.
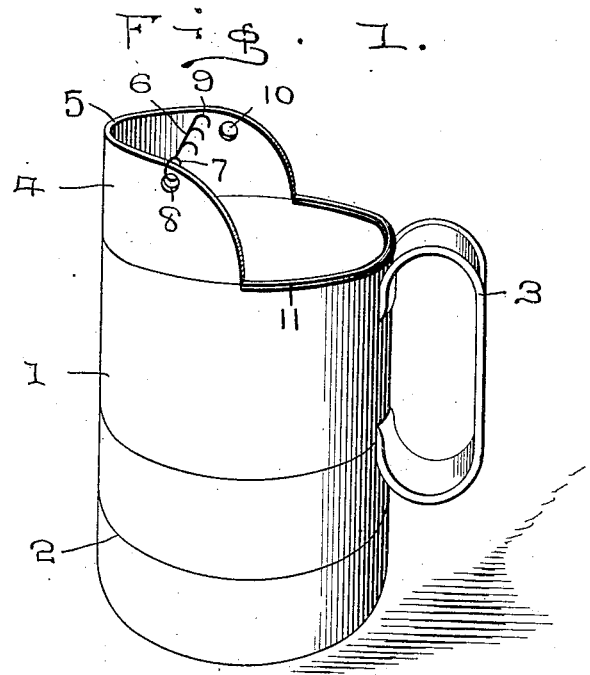
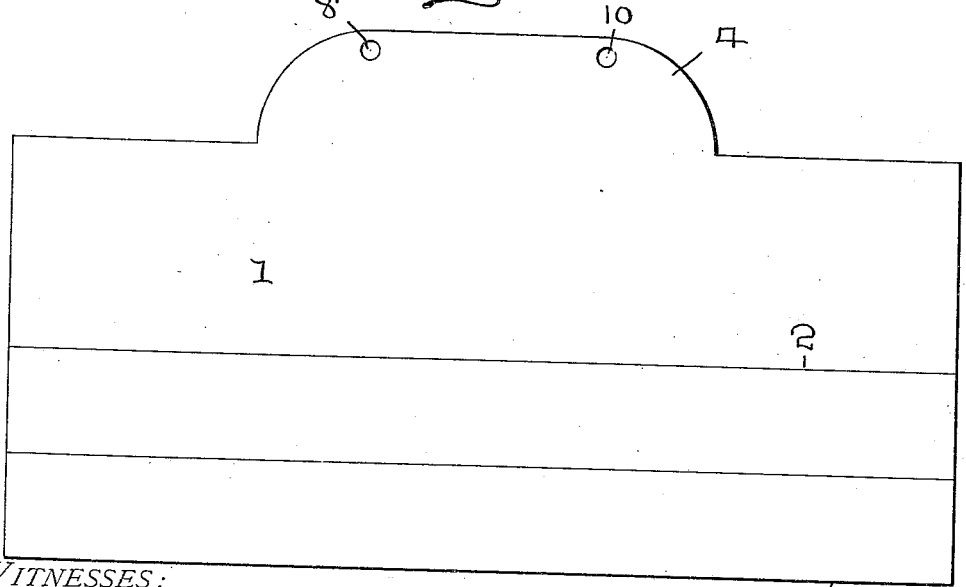
WITNESSES:
INVENTOR
J. Lazarus
BY
W. J. Fitzgerald
Attorneys

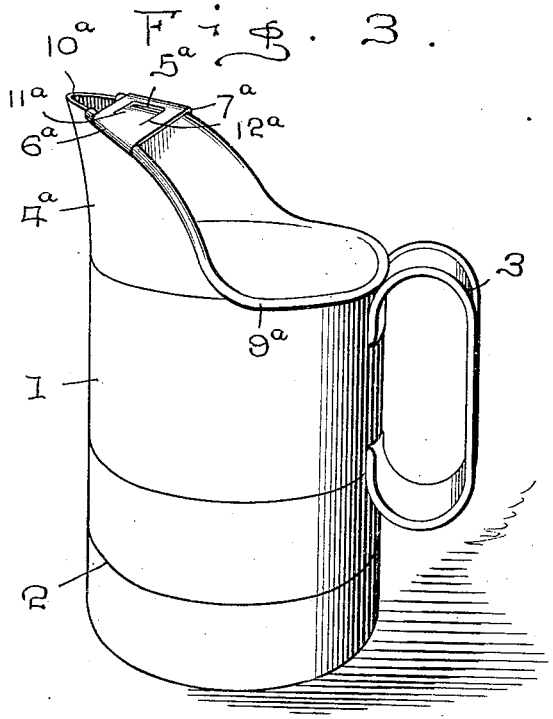
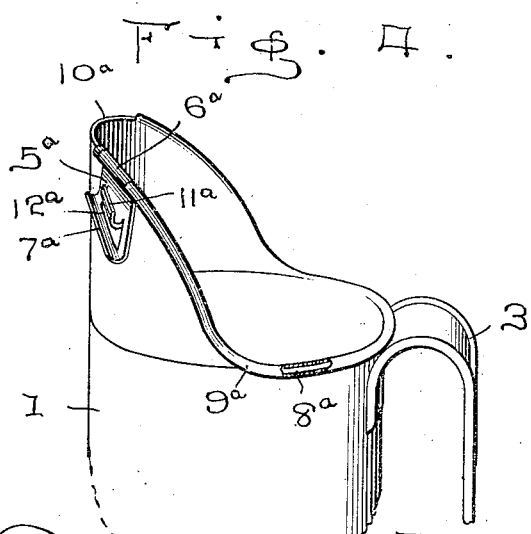

UNITED STATES PATENT OFFICE.

JOHN LAZARUS, OF WILKES-BARRE, PENNSYLVANIA.

MEASURING DEVICE.

955,519.  Specification of Letters Patent.  Patented Apr. 19, 1910.

Application filed August 13, 1909. Serial No. 512,685.

*To all whom it may concern:*

Be it known that I, JOHN LAZARUS, a citizen of the United States, residing at Wilkes-Barre, in the county of Luzerne and State of Pennsylvania, have invented certain new and useful Improvements in Measuring Devices; and I do hereby declare the following to be a full, clear, and exact description of the invention, such as will enable others skilled in the art to which it appertains to make and use the same.

My invention relates to new and useful improvements in measuring devices and more particularly to that class adapted to be used for measuring liquids and my object is to provide a device of this class for measuring the liquid and entering the same into receptacles having openings therein of different sizes.

A further object is to provide means for holding the lip of the measure in a contracted position whereby the liquid may be entered into an object having a small opening and a further object is to provide means for obtaining various degrees of contraction of the lip of the measure, thereby adapting the same for pouring liquid into objects having openings of various sizes.

Other objects and advantages will be hereinafter referred to and more particularly pointed out in the claims.

In the accompanying drawings forming part of this application, Figure 1 is a perspective view of a measure, showing my improved contracting device attached thereto, the spout of the lip of the measure being in its normal position. Fig. 2 is a plan view of the blank employed for forming the measure before the same is assembled. Fig. 3 is a perspective view of a measure showing a modified form of device for contracting the lip thereof, and, Fig. 4 is a detail perspective view of that form of measure shown in Fig. 3 with the lip in its normal position.

Referring to the drawings in which similar reference numerals designate corresponding parts throughout the several views, 1 indicates the body of the measure, which body is preferably constructed in different sizes and provided with division lines 2 to indicate quantities less than the capacity of the body, said body also being provided with a suitable handle 3, whereby it may be readily transported.

Extending upwardly from the upper edge of the body 1 is a lip 4, which lip extends substantially half-way around the body and has its free edge tapered, said lip providing a convenient means for emptying the contents of the body into a receptacle, especially when the receptacle is provided with a comparatively small opening. The curvature of the lip 4 normally corresponds to the curvature of the body 1, but when the opening in the receptacle is of such size as to cause the liquid in the body to spill when the lip is in its normal position, the edges of the lip are to be moved toward each other, thereby contracting the lip and forming a funnel-like passage at the apex 5 of the lip, in which event the contents of the measure may be introduced into a receptacle having a very small opening therein.

In constructing my improved form of measure, the body and lip are formed of one continuous piece of material and the lip so arranged as to extend substantially in vertical alinement with the wall of the body and the edges of the lip may be slightly curved as shown in Figs. 1 and 2, or the curvature may extend from the base to the apex of the lip as shown in Figs. 3 and 4, if preferred. If but a small quantity of liquid is to be introduced into the vessel having a small opening, the edges of the lip 4 may be moved together by pressure of the thumb and finger thereon, thereby contracting the lip and forming a funnel-like opening at the apex 5, but when a considerable quantity of the liquid is to be measured and introduced into a vessel having a small opening, I provide means for holding the lip in its contracted position, which consists of a strap 6, one end of which is provided with a loop 7, which engages an opening 8 in one portion of the lip, the opposite end of the strap being provided with a plurality of curved fingers 9, which are adapted to engage an opening 10 at a point diametrically opposite the opening 8 and by providing a plurality of the fingers, the lip may be contracted to various degrees, thereby accommodating the funnel-like opening or passage to the opening in the vessel into which the liquid is being placed. The material forming the lips is of sufficient resiliency to immediately resume its initial position as soon as the pressure on the edges of the lip is released and if desired, a reinforcing wire or roll 11 may be extended around the exposed top portion of the body and if desired, may be extended also around the free edge of the lip 4, thereby greatly strengthening the exposed edges of the cup and lip.

In Figs. 3 and 4 of the drawings I have shown a slightly modified form of strap and reinforcing device, which comprises a strap $5^a$, having formed at one of its ends a loop $6^a$, while the opposite end thereof is provided with a hook $7^a$, the loop or eye $6^a$ being adapted to surround a reinforcing wire $8^a$, while the hook $7^a$ is adapted to engage the cover $9^a$ for the wire $8^a$ at the opposite side of the lip. The reinforcing wire $8^a$, preferably terminates as shown at a point slightly below the highest portion of the lip, thereby leaving the central portion or apex $10^a$ free to readily bend and as the strap $5^a$ is of less length than the distance across the lip when in its normal position, the portion $10^a$ will be held in its contracted position when the hook $7^a$ is in engagement with the covering opposite the hinge point of the strap as shown in Fig. 3, thereby forming a contracted spout through which the contents of the body passes and providing means for depositing liquid in an object having a small opening. The strap $5^a$ may be also arranged to contract the lip $4^a$ to various degrees by striking out portions of the body of the strap to form tongues $11^a$, which tongues are directed downwardly and provided with hook terminals $12^a$, which are adapted to engage the covering $9^a$ in the same manner as the hook 7.

It will thus be seen that I have provided a suitable measuring device for measuring and emptying liquids into vessels having openings of varying sizes and it will likewise be seen that by providing the retaining straps as shown, the lip may be held in its contracted position while the contents of the receptacle is being emptied, the contraction of the lip forming a funnel-like spout at the apex of the lip. It will further be seen that by forming the body and lip of one continuous strip of metal, the same can be very cheaply constructed and it will likewise be seen that the contracting strap may be readily attached to the lip and at a nominal expense.

What I claim is:

1. A measuring device comprising a body having an upwardly extending lip, and adjusting means of less length than the width of said lip and adapted to engage the opposite top edge portions of said lip for contracting said lip.

2. In a measuring device, the combination with a body having a lip extending upwardly therefrom, of a contracting device of less length than the width of said lip, adapted to engage opposite top edge portions of said lip, said contracting device having means thereon to retain the lip in contracted position.

3. In a measuring device, the combination with a body having a lip extending upwardly therefrom; of a strap hingedly secured to the lip and having means thereon adapted to engage the lip at a point diametrically opposite its hinge point, said strap being of less length than the distance across the lip when in its normal position, whereby said lip will be held in a contracted position.

In testimony whereof I have signed my name to this specification in the presence of two subscribing witnesses.

JOHN LAZARUS.

Witnesses:
CHAS. J. BAAB,
FRANK BAAB.